US010459985B2

(12) United States Patent
Shepherd et al.

(10) Patent No.: US 10,459,985 B2
(45) Date of Patent: Oct. 29, 2019

(54) MANAGING BEHAVIOR IN A VIRTUAL COLLABORATION SESSION

(71) Applicant: Dell Products, L.P., Round Rock, TX (US)

(72) Inventors: Jason A. Shepherd, Austin, TX (US); Michael S. Gatson, Austin, TX (US); Todd Swierk, Austin, TX (US); Clifton J. Barker, Austin, TX (US); Yuan-Chang Lo, Austin, TX (US)

(73) Assignee: Dell Products, L.P., Round Rock, TX (US)

( * ) Notice: Subject to any disclaimer, the term of this patent is extended or adjusted under 35 U.S.C. 154(b) by 237 days.

(21) Appl. No.: 14/096,918

(22) Filed: Dec. 4, 2013

(65) Prior Publication Data

US 2015/0154291 A1 Jun. 4, 2015

(51) Int. Cl.
*G06F 17/30* (2006.01)
*G06F 16/95* (2019.01)
*H04L 29/06* (2006.01)
*H04L 29/08* (2006.01)
*G06Q 10/10* (2012.01)

(52) U.S. Cl.
CPC .......... *G06F 16/95* (2019.01); *G06Q 10/101* (2013.01); *H04L 65/403* (2013.01); *H04L 67/22* (2013.01)

(58) Field of Classification Search
CPC .... G06Q 10/103; G06Q 10/101; G06Q 50/01; G06F 17/30011; G06F 11/3438; G06F 17/30893; G06F 3/0481; G06F 19/26; H04L 65/403; H04L 12/1822; H04L 12/1827; H04L 12/581; H04L 51/04; H04L 29/08576; H04L 67/141
See application file for complete search history.

(56) References Cited

U.S. PATENT DOCUMENTS

| | | | | |
|---|---|---|---|---|
| 6,629,129 | B1 * | 9/2003 | Bookspan | G06Q 10/10 709/204 |
| 8,539,027 | B1 * | 9/2013 | Chen | G06Q 50/01 709/202 |
| 2007/0005752 | A1 * | 1/2007 | Chawla | H04L 12/1831 709/224 |
| 2007/0100939 | A1 * | 5/2007 | Bagley | G06Q 10/10 709/204 |

(Continued)

OTHER PUBLICATIONS

E-Collaboration: The Reality of Virtually, Rutkowski et al., IEEE transactions on professional communication, 45(4), pp. 219-230, 2002.*

(Continued)

*Primary Examiner* — Augustine K. Obisesan
(74) *Attorney, Agent, or Firm* — Fogarty LLP

(57) ABSTRACT

Systems and methods for managing behavior in a virtual collaboration session. In some embodiments, an Information Handling System (IHS) may include a processor and a memory coupled to the processor, the memory including program instructions stored thereon that, upon execution by the processor, cause the IHS to: receive engagement metrics from a participant of a virtual collaboration session, wherein the engagement metrics are indicative of the participant's level of engagement in the virtual collaboration session; calculate a score based upon the engagement metrics; and provide the score to the participant.

17 Claims, 8 Drawing Sheets

(56) References Cited

U.S. PATENT DOCUMENTS

| | | | | |
|---|---|---|---|---|
| 2007/0288569 A1* | 12/2007 | Yuan | H04L 67/22 | 709/204 |
| 2008/0088698 A1* | 4/2008 | Patel | H04N 7/15 | 348/14.09 |
| 2009/0006980 A1* | 1/2009 | Hawley | G06Q 10/107 | 715/752 |
| 2009/0006982 A1* | 1/2009 | Curtis | G06Q 10/10 | 715/753 |
| 2009/0063991 A1* | 3/2009 | Baron | H04L 12/1822 | 715/751 |
| 2009/0083637 A1* | 3/2009 | Skakkebaek | G06Q 10/10 | 715/751 |
| 2009/0089709 A1* | 4/2009 | Baier | G05B 19/409 | 715/817 |
| 2009/0172100 A1* | 7/2009 | Callanan | G09B 7/02 | 709/205 |
| 2009/0222742 A1* | 9/2009 | Pelton | G06Q 10/10 | 715/753 |
| 2009/0271438 A1* | 10/2009 | Agapi | G06Q 10/1095 | |
| 2010/0036929 A1* | 2/2010 | Scherpa | G06Q 10/10 | 709/207 |
| 2010/0064010 A1* | 3/2010 | Alkov | G09B 7/02 | 709/206 |
| 2010/0114673 A1* | 5/2010 | Briggs | G06Q 10/10 | 705/7.42 |
| 2011/0072362 A1* | 3/2011 | Denner | G06Q 10/109 | 715/751 |
| 2011/0099006 A1* | 4/2011 | Sundararaman | G10L 15/26 | 704/208 |
| 2011/0314105 A1* | 12/2011 | Chen | G06Q 10/103 | 709/205 |
| 2012/0147123 A1* | 6/2012 | Lian | H04N 7/15 | 348/14.03 |
| 2012/0158849 A1* | 6/2012 | Yoakum | H04L 12/1822 | 709/205 |
| 2012/0166532 A1* | 6/2012 | Juan | G06Q 30/0224 | 709/204 |
| 2012/0296914 A1* | 11/2012 | Romanov | G11B 27/034 | 707/741 |
| 2012/0331404 A1* | 12/2012 | Buford | G06Q 10/101 | 715/757 |
| 2013/0021907 A1* | 1/2013 | O'Sullivan | H04L 41/5009 | 370/235 |
| 2013/0054509 A1* | 2/2013 | Kass | G06Q 10/00 | 706/55 |
| 2013/0106985 A1* | 5/2013 | Tandon | H04N 7/157 | 348/14.08 |
| 2013/0159296 A1* | 6/2013 | Fay | G06F 17/30867 | 707/725 |
| 2013/0254279 A1* | 9/2013 | Bentley | G06Q 10/1095 | 709/204 |
| 2013/0290434 A1* | 10/2013 | Bank | G06Q 10/10 | 709/206 |
| 2013/0339875 A1* | 12/2013 | Sahai | H04L 12/1827 | 715/753 |
| 2014/0082100 A1* | 3/2014 | Sammon | G06Q 10/109 | 709/206 |
| 2014/0214861 A1* | 7/2014 | Zheng | G06F 17/3053 | 707/749 |
| 2015/0113057 A1* | 4/2015 | Carricarte | H04L 67/22 | 709/204 |

OTHER PUBLICATIONS

Facilitating Multiparty Dialog with Gaze, Gesture, and Speech, Bohus et al (Year: 2010).*

* cited by examiner

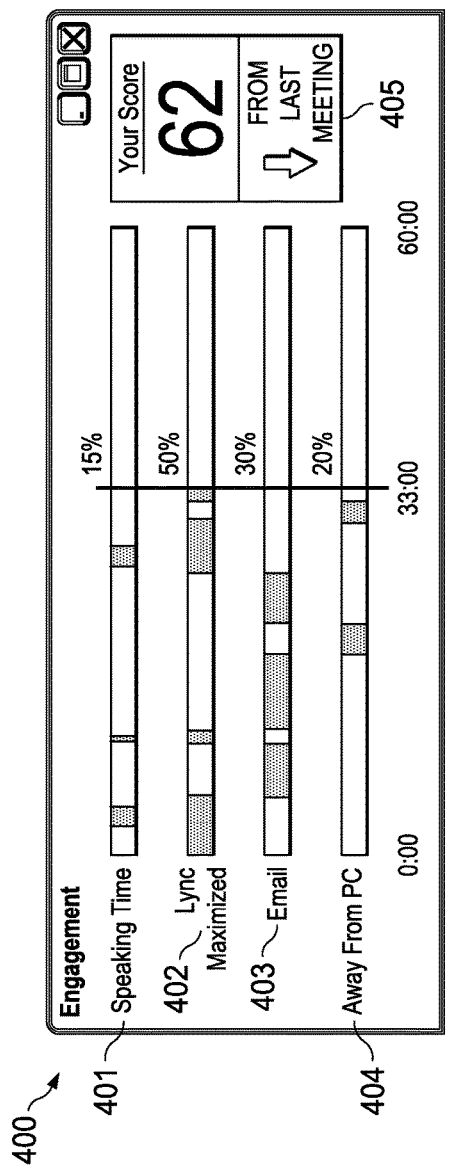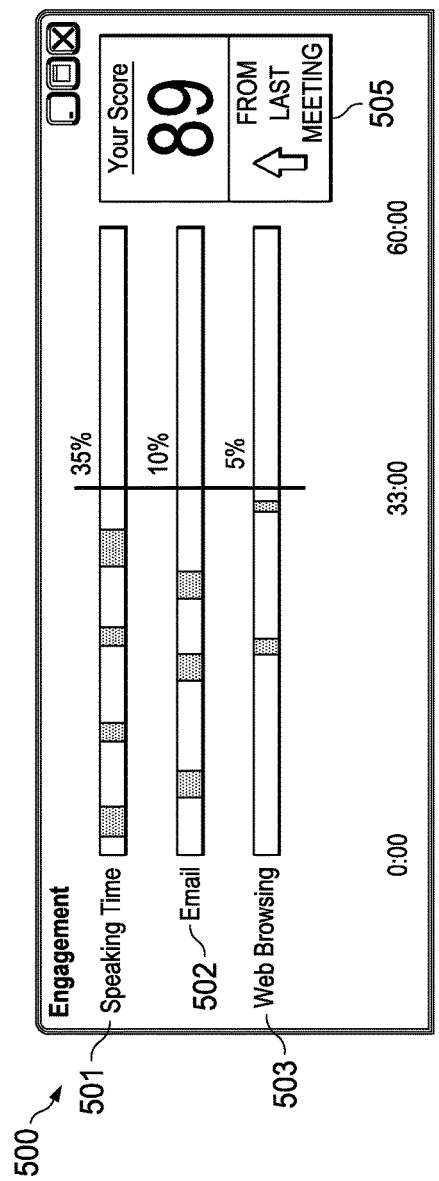

MANAGING BEHAVIOR IN A VIRTUAL COLLABORATION SESSION

FIELD

This disclosure relates generally to computer systems, and more specifically, to systems and methods for managing behavior in a virtual collaboration session.

BACKGROUND

As the value and use of information continues to increase, individuals and businesses seek additional ways to process and store information. One option is an Information Handling System (IHS). An IHS generally processes, compiles, stores, and/or communicates information or data for business, personal, or other purposes. Because technology and information handling needs and requirements may vary between different applications, IHSs may also vary regarding what information is handled, how the information is handled, how much information is processed, stored, or communicated, and how quickly and efficiently the information may be processed, stored, or communicated. The variations in IHSs allow for IHSs to be general or configured for a specific user or specific use such as financial transaction processing, airline reservations, enterprise data storage, global communications, etc. In addition, IHSs may include a variety of hardware and software components that may be configured to process, store, and communicate information and may include one or more computer systems, data storage systems, and networking systems.

In some situations, two or more IHSs may be operated by different users or team members participating in a "virtual collaboration session" or "virtual meeting." Generally speaking, "virtual collaboration" is a manner of collaboration between users that is carried out via technology-mediated communication. Although virtual collaboration may follow similar processes as conventional collaboration, the parties involved in a virtual collaboration session communicate with each other, at least in part, through technological channels.

In the case of an IHS- or computer-mediated collaboration, a virtual collaboration session may include, for example, audio conferencing, video conferencing, a chat room, a discussion board, text messaging, instant messaging, shared database(s), whiteboarding, wikis, application specific groupware, or the like. For instance, "whiteboarding" is the placement of shared images, documents, or other files on a shared on-screen notebook or whiteboard. Videoconferencing and data conferencing functionality may let users annotate these shared documents, as if on a physical whiteboard. With such an application, several people may be able to work together remotely on the same materials during a virtual collaboration session.

SUMMARY

Embodiments of systems and methods for managing behavior in a virtual collaboration session are described herein. In an illustrative, non-limiting embodiment, a method may include receiving engagement metrics from a participant of a virtual collaboration session, where the engagement metrics are indicative of the participant's level of engagement in the virtual collaboration session, calculating a score based upon the engagement metrics, and providing the score to the participant.

In some implementations, the engagement metrics may be determined based upon data selected from the group consisting of: a number of software applications being executed by a participant's device during the virtual collaboration session, an identity of the software applications being executed by the participant's device during the virtual collaboration session, an amount of web surfing performed by the participant during the virtual collaboration session, and an amount of email reading performed by the participant during the virtual collaboration session. Additionally or alternatively, the engagement metrics may be determined based upon data selected from the group consisting of: facial movement of the participant during the virtual collaboration session, gestures made by the participant during the virtual collaboration session, eye movement of the participant during the virtual collaboration session, and voice interaction by the participant during the virtual collaboration session.

The method may include selecting one or more of the engagement metrics to calculate the score depending upon a context where the participant is found during the virtual collaboration session, and the context may include an in-person meeting or a remote meeting. In some cases, receiving and calculating may be performed as a background process, and the providing may occur in response to a determination that an engagement metric has reached a corresponding threshold value. Also to calculate the score, the method may include calculating a weighted sum of the engagement metrics using a weight value assigned to each engagement metric.

In some implementations, the method may include changing a weight value assigned to an engagement metric depending upon whether the participant is physically disposed in proximity to another participant of the virtual collaboration session. The engagement metric may be determined based upon facial movement during the virtual collaboration session.

Additionally or alternatively, the method may include changing a weight value assigned to an engagement metric depending upon whether the participant has typed a keyword into an application that has been spoken during the virtual collaboration session; and/or allowing the participant to change a weight value assigned to an engagement metric depending upon the participant's personal preference for prioritizing a first activity over a second activity.

The method may include reducing the score based, at least in part, upon a lack of a selected engagement activity for a predetermined period of time. Additionally or alternatively, the method may include increasing the score based, at least in part, upon an improvement of a selected engagement activity for a predetermined period of time.

In another illustrative, non-limiting embodiment, a method may include receiving, at an Information Handling System (IHS) configured to host a virtual collaboration session among a plurality of participants, individual engagement metrics indicative of each participant's individual level of engagement in the virtual collaboration session. The method may also include receiving, at the IHS, team engagement metrics indicative of a team's collective level of engagement during the virtual collaboration session. The method may further include providing, by the IHS to an organizer of the virtual collaboration session, information representing an aggregation of the individual engagement metrics with the team engagement metrics.

In some cases, the individual engagement metrics may be received anonymously. For example, individual engagement metrics may be selected from the group consisting of: a number of software applications being executed by a participant's computing device during the virtual collaboration session, an identity of the software applications being executed by the participant's computing device during the virtual collaboration session, an amount of web surfing performed the participant during the virtual collaboration session, an amount of email reading performed the participant during the virtual collaboration session, facial movement by the participant during the virtual collaboration session, gestures made by the participant during the virtual collaboration session, eye movement by the participant during the virtual collaboration session, and voice interaction by the participant during the virtual collaboration session.

Meanwhile, team engagement metrics may be selected from the group consisting of: late participant arrivals at the virtual collaboration meeting, a participation rate over time, a conversation that stays on a same topic for a predetermined amount time, number of participants speaking at once, tone in participants' voices, time spent on each slide presented during the virtual collaboration session, number of times related virtual collaboration session lacked an agenda, a completion rate for an agenda, a percentage of planned topics covered during the virtual collaboration session, exceeding time planned for the virtual collaboration session, and capture rate of actions and decisions related to the virtual collaboration session.

In some cases, the information may include a suggestion to increase or decrease a frequency of future virtual collaboration sessions. Additionally or alternatively, the information may include a suggestion of an alternative to a virtual collaboration session for a predetermined task.

In yet another illustrative, non-limiting embodiment, a method may include hosting a virtual collaboration session among a plurality of participants and allowing a given one of the plurality of participants to set a time-to-talk interval for another one of the plurality of participants during the virtual collaboration session. The method may also include identifying a plurality of topics to be covered during the virtual collaboration session, determining when the virtual collaboration session has transitioned from a first topic to a second topic, and notifying one or more of the plurality of participants if one or more of the plurality of topics is at risk of not being covered during the virtual collaboration session because of insufficient time. The method may further include warning one or more of the plurality of participants in anticipation of a hard-stop event.

In some embodiments, one or more of the techniques described herein may be performed, at least in part, by an Information Handling System (IHS) operated by a given one of a plurality of participants of a virtual collaboration session. In other embodiments, these techniques may be performed by an IHS having a processor and a memory coupled to the processor, the memory including program instructions stored thereon that, upon execution by the processor, cause the IHS to execute one or more operations. In yet other embodiments, a non-transitory computer-readable medium may have program instructions stored thereon that, upon execution by an IHS, cause the IHS to execute one or more of the techniques described herein.

BRIEF DESCRIPTION OF THE DRAWINGS

The present invention(s) is/are illustrated by way of example and is/are not limited by the accompanying figures, in which like references indicate similar elements. Elements in the figures are illustrated for simplicity and clarity, and have not necessarily been drawn to scale.

FIGS. 4 and 5 are screenshots illustrating examples of engagement data according to some embodiments.

DETAILED DESCRIPTION

Figure 1:
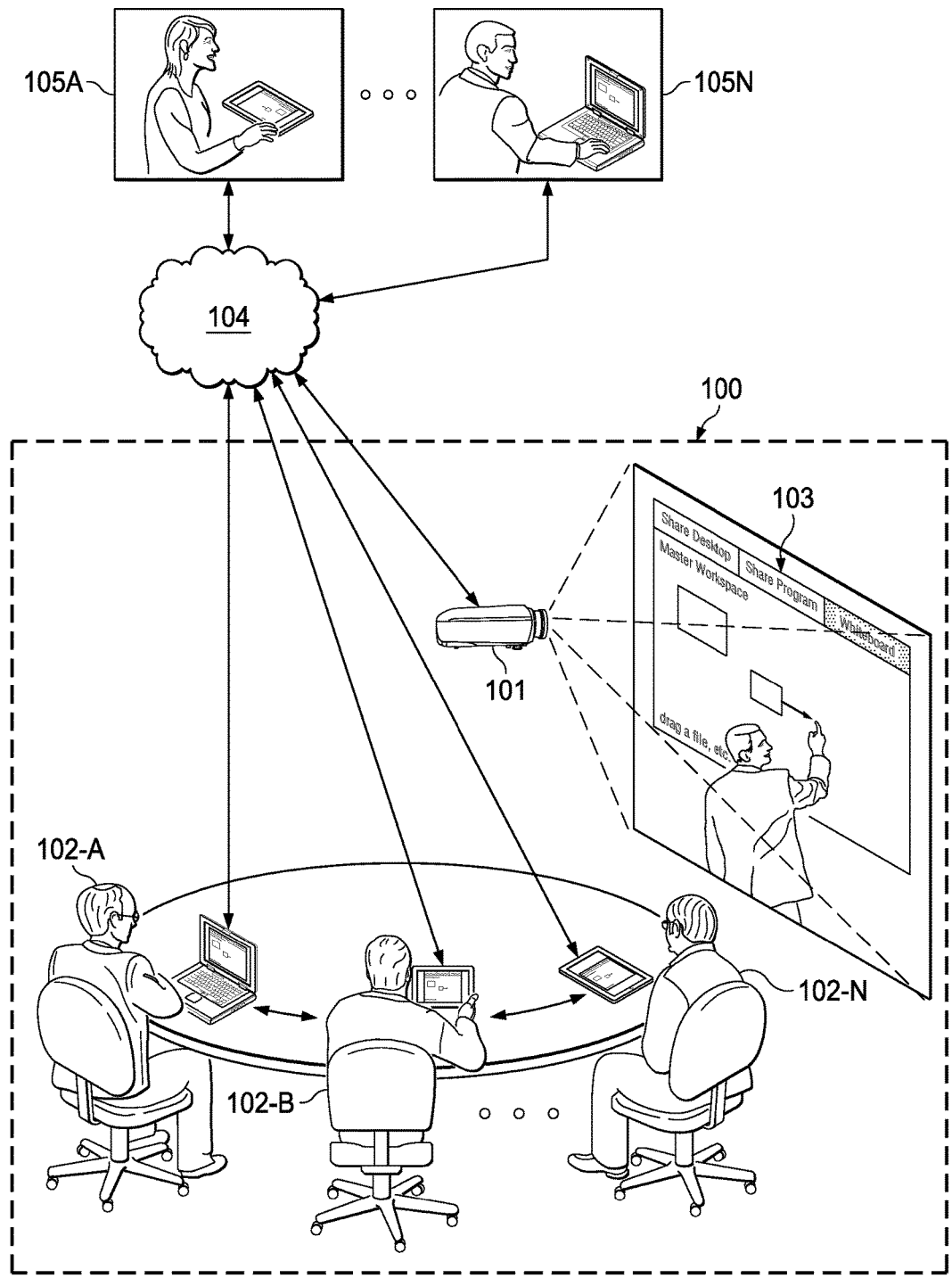
FIG. 1 is a diagram illustrating an example of an environment where systems and methods for managing behavior in a virtual collaboration session may be implemented according to some embodiments.

To facilitate explanation of the various systems and methods discussed herein, the following description has been split into sections. It should be noted, however, that the various sections, headings, and subheadings used herein are for organizational purposes only, and are not meant to limit or otherwise modify the scope of the description or the claims.

Overview

The inventors hereof have recognized a need for new tools that enable better team interactions and improve effectiveness in the workplace, particularly as the workforce becomes more geographically-distributed and as the volume of business information created and exchanged increases to unprecedented levels. Existing tools intended to facilitate collaboration include digital whiteboarding, instant messaging, file sharing, and unified communication platforms. Unfortunately, such conventional tools are fragmented and do not adequately address certain problems specific to real-time interactions. In addition, these tools do not capitalize on contextual information for further gains in productivity and ease of use.

Examples of problems faced by distributed teams include the lack of a universally acceptable manner of performing whiteboarding sessions. The use of traditional dry erase boards in meeting rooms excludes or limits the ability of remote workers to contribute and current digital whiteboarding options are unnatural to use and are therefore not being adopted. In addition, there are numerous inefficiencies in setting up meeting resources, sharing in real-time, and distribution of materials after meetings such as emailing notes, presentation materials, and digital pictures of whiteboard sketches. Fragmentation across tool sets and limited format optimization for laptops, tablets, and the use of in-room projectors present a further set of issues. Moreover, the lack of continuity between meetings and desk work and across a meeting series including common file repositories, persistent notes and whiteboard sketches, and historical context can create a number of other problems and inefficiencies.

To address these, and other concerns, the inventors hereof have developed systems and methods that address, among other things, the setting up of resources for a virtual collaboration session, the taking of minutes and capture of whiteboard sketches, the creation and management to agendas, and/or provide the ability to have the right participants and information on hand for a collaboration session.

In some embodiments, these systems and methods focus on leveraging technology to increase effectiveness of real-time team interactions in the form of a "connected productivity framework." A digital or virtual workspace part of such a framework may include an application that enables both in-room and remote users the ability to interact easily with the collaboration tool in real-time. The format of such a virtual workspace may be optimized for personal computers (PCs), tablets, mobile devices, and/or in-room projection. The workspace may be shared across all users' personal devices, and it may provide a centralized location for presenting files and whiteboarding in real-time and from anywhere. The integration of context with unified communication and note-taking functionality provides improved audio, speaker identification, and automation of meeting minutes.

The term "context," as used herein, refers to information that may be used to characterize the situation of an entity. An entity is a person, place, or object that is considered relevant to the interaction between a user and an application, including the user and application themselves. Examples of context include, but are not limited to, location, people and devices nearby, and calendar events.

For instance, a connected productivity framework may provide, among other things, automation of meeting setup, proximity awareness for automatic joining of sessions, Natural User Interface (NUI) control of a workspace to increase the usability and adoption, intelligent information management and advanced indexing and search, and/or meeting continuity. Moreover, a set of client capabilities working in concert across potentially disparate devices may include: access to a common shared workspace with public and private workspaces for file sharing and real-time collaboration, advanced digital whiteboarding with natural input to dynamically control access, robust search functionality to review past work, and/or the ability to seamlessly moderate content flow, authorization, and intelligent information retrieval.

When certain aspects of the connected productivity framework described herein are applied to a projector, for instance, the projector may become a fixed point of reference providing contextual awareness. The projector may maintain a relationship to the room and associated resources (e.g., peripheral hardware). This allows the projector be a central hub for organizing meetings, and it does not necessarily rely on a host user and their device to be present for meeting and collaborating.

In some implementations, a cloud-hosted or enterprise service infrastructure as described herein may allow virtual collaboration session to be persistent. Specifically, once a document, drawing, or other content is used during a whiteboard session, for example, the content may be tagged as belonging to that session. When a subsequent session takes places that is associated with a previous session (and/or when the previous session is resumed at a later time), the content and transactions previously performed in the virtual collaboration environment may be retrieved so that, to participants, there is meeting continuity. In some embodiments, the systems and methods described herein may provide "digital video recorder" (DVR)-type functionality for collaboration sessions, such that participants may be able to record meeting events and play those events back at a later time, or "pause" the in-session content in temporary memory. The latter feature may enable a team to pause a meeting when they exceed the scheduled time and resume the in-session content in another available conference room, for example.

As will be understood by a person of ordinary skill in the art in light of this disclosure, virtually any commercial business setting that requires meeting or collaboration may implement one or more aspects of the systems and methods described herein. Additionally, aspects of the connected productivity framework described herein may be expanded to other areas, such as educational verticals for use in classrooms, or to consumers for general meet-ups.

Virtual Collaboration Architecture

Turning now to FIG. 1, a diagram illustrating an example of an environment where systems and methods for managing behavior in a virtual collaboration session may be implemented is depicted according to some embodiments. As shown, interactive collaboration tool 101 operates as a central meeting host and/or shared digital whiteboard for conference room 100 in order to enable a virtual collaboration session. In some embodiments, interactive collaboration tool may include (or otherwise be coupled to) a real-time communications server, a web server, an object store server, and/or a database. Moreover, interactive collaboration tool 101 may be configured with built-in intelligence and contextual awareness to simplify meeting setup and provide continuity between meetings and desk work.

In some implementations, for example, interactive collaboration tool 101 may include a video projector or any other suitable digital and/or image projector that receives a video signal (e.g., from a computer, a network device, or the like) and projects corresponding image(s) 103 on a projection screen using a lens system or the like. In this example, image 103 corresponds to a whiteboarding application, but it should be noted that any collaboration application may be hosted and/or rendered using tool 101 during a virtual collaboration session.

Any number of in-room participants 102A-N and any number of remote participants 105A-N may each operate a respective IHS or computing device including, for example, desktops, laptops, tablets, or smartphones. In a typical situation, in-room participants 102A-N are in close physical proximity to interactive collaboration tool 101, whereas remote participants 105A-N are located in geographically distributed or remote locations, such as other offices or their homes. In other situations, however, a given collaboration session may include only in-room participants 102A-N or only remote participants 105A-N.

With regard to participants 102A-N and 105A-N, it should be noted that users participating in a virtual collaboration session or the like may have different classifications. For example, a participant may include a member of the session. A moderator may be an owner of the meeting workspace and leader that moderates the participants of the meeting. Often the moderator has full control of the session, including material content, what is displayed on the master workspace, and the invited list of participants. Moreover, an editor may include a meeting participant or the moderator who has write privileges to update content in the meeting workspace.

Interactive collaboration tool 101 and participants 102A-N and 105A-N may include any end-point device capable of audio or video capture, and that has access to network 104. In various embodiments, telecommunications network 104 may include one or more wireless networks, circuit-switched networks, packet-switched networks, or any combination thereof to enable communications between two or more of IHSs. For example, network 104 may include a Public Switched Telephone Network (PSTN), one or more cellular networks (e.g., third generation (3G), fourth generation (4G), or Long Term Evolution (LTE) wireless networks), satellite networks, computer or data networks (e.g., wireless networks, Wide Area Networks (WANs), metropolitan area networks (MANs), Local Area Networks (LANs), Virtual Private Networks (VPN), the Internet, etc.), or the like.

Figure 2:
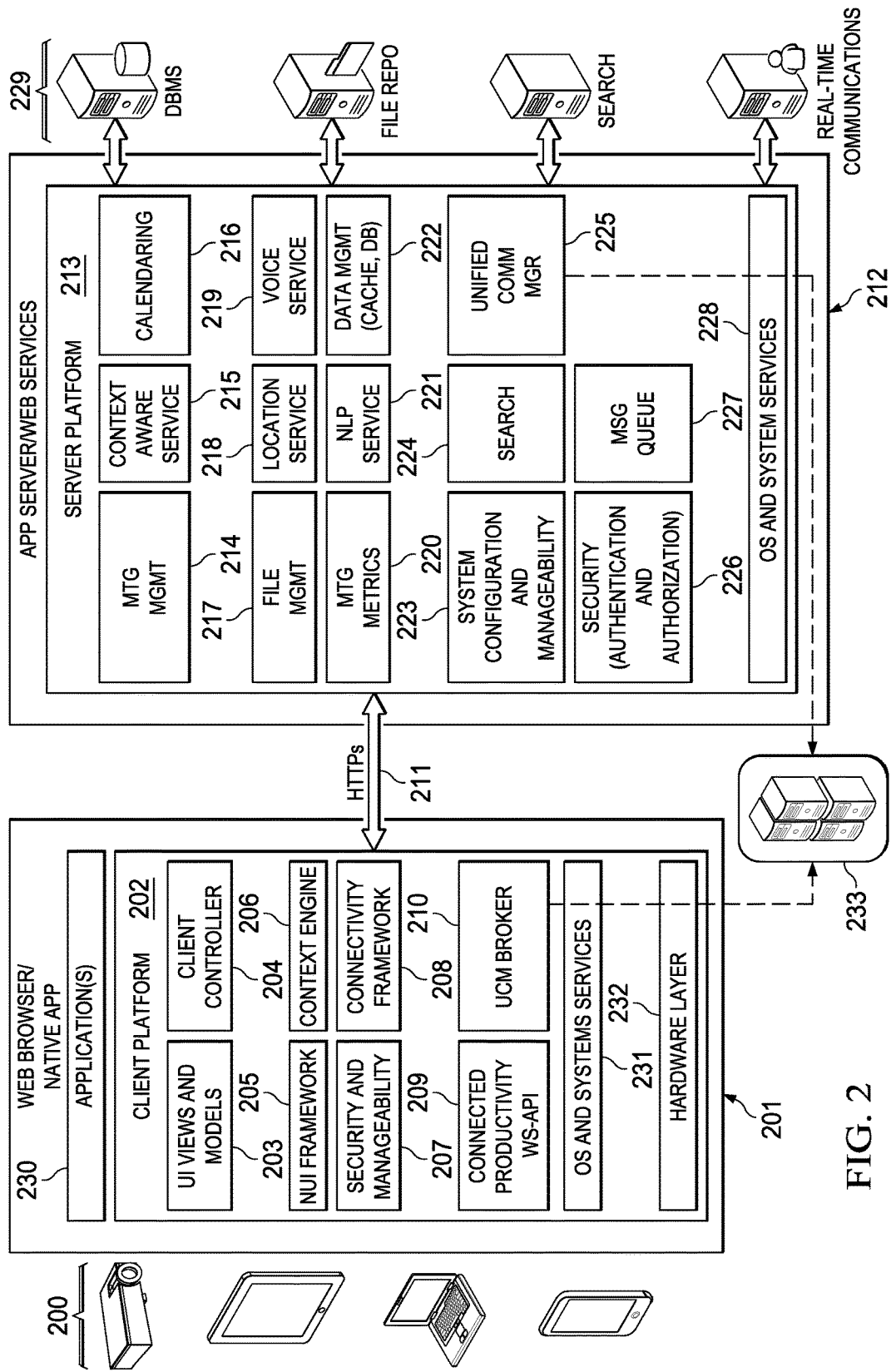
FIG. 2 is a block diagram of a cloud-hosted or enterprise service infrastructure for managing information and content sharing in a virtual collaboration session according to some embodiments.

FIG. 2 is a block diagram of a cloud-hosted or enterprise service infrastructure. In some embodiments, the infrastructure of FIG. 2 may be implemented in the context of environment of FIG. 1 for managing information and content sharing in a virtual collaboration session. Particularly, one or more participant devices 200 (operated by in-room participants 102A-N and/or remote participants 105A-N) may be each configured to execute client platform 202 in the form of a web browser or native application 201. As such, on the client side, one or more virtual collaboration application(s) 230 (e.g., a whiteboarding application or the like) may utilize one or more of modules 203-210, 231, and/or 232 to perform one or more virtual collaboration operations. Application server or web services 212 may contain server platform 213, and may be executed, for example, by interactive collaboration tool 101.

As illustrated, web browser or native application 201 may be configured to communicate with application server or web services 212 (and vice versa) via link 211 using any suitable protocol such as, for example, Hypertext Transfer Protocol (HTTP) or HTTP Secure (HTTPS). Each module within client platform 202 and application server or web services 212 may be responsible to perform a specific operation or set of operations within the collaborative framework.

Particularly, client platform 202 may include user interface (UI) view & models module 203 configured to provide a lightweight, flexible user interface that is portable across platforms and device types (e.g., web browsers in personal computers, tablets, and phones using HyperText Markup Language (HTML) 5, Cascading Style Sheets (CSS) 3, and/or JavaScript). Client controller module 204 may be configured to route incoming and outgoing messages accordingly based on network requests or responses. Natural User Interface (NUI) framework module 205 may be configured to operate various hardware sensors for touch, multi-point touch, visual and audio provide the ability for voice commands and gesturing (e.g., touch and 3D based). Context engine module 206 may be configured to accept numerous inputs such as hardware sensor feeds and text derived from speech. In some instances, context engine module 206 may be configured to perform operations such as, for example, automatic participant identification, automated meeting joining and collaboration via most effective manner, location aware operations (e.g., geofencing, proximity detection, or the like) and associated management file detection/delivery, etc.

Client platform 202 also includes security and manageability module 207 configured to perform authentication and authorization operations, and connectivity framework module 208 configured to detect and connect with other devices (e.g., peer-to-peer). Connected productivity module 209 may be configured to provide a web service API (WS-API) that allows clients and host to communicate and/or invoke various actions or data querying commands. Unified Communication (UCM) module 210 may be configured to broker audio and video communication including file transfers across devices and/or through third-party systems 233.

Within client platform 202, hardware layer 232 may include a plurality of gesture tracking (e.g., touchscreen or camera), audio and video capture (e.g., camera, microphone, etc.), and wireless communication devices or controllers (e.g., Bluetooth®, WiFi, Near Field Communications, or the like). Operating system and system services layer 231 may have access to hardware layer 232, upon which modules 203-210 rest. In some cases, third-party plug-ins (not shown) may be communicatively coupled to virtual collaboration application 230 and/or modules 203-210 via an Application Programming Interface (API).

Server platform 213 includes meeting management module 214 configured to handle operations such as, for example, creating and managing meetings, linking virtual workspace, notifying participants of invitations, and/or providing configuration for auto calling (push/pull) participants upon start of a meeting, among others. Context aware service 215 may be configured to provide services used by context engine 206 of client platform 202. Calendaring module 216 may be configured to unify participant and resource scheduling and to provide smart scheduling for automated search for available meeting times.

Moreover, server platform 213 also includes file management module 217 configured to provide file storage, transfer, search and versioning. Location service module 218 may be configured to perform location tracking, both coarse and fine grained, that relies on WiFi geo-location, Global Positioning System (GPS), and/or other location technologies. Voice service module 219 may be configured to perform automated speech recognition, speech-to-text, text-to-speech conversation and audio archival. Meeting metrics module 220 may be configured to track various meeting metrics such as talk time, topic duration and to provide analytics for management and/or participants.

Still referring to server platform 213, Natural Language Processing (NLP) service module 221 may be configured to perform automatic meeting summation (minutes), conference resolution, natural language understanding, named entity recognition, parsing, and disambiguation of language. Data management module 222 may be configured to provide distributed cache and data storage of application state and session in one or more databases. System configuration & manageability module 223 may provide the ability to configure one or more other modules within server platform 213. Search module 224 may be configured to enable data search operations, and UCM manager module 225 may be configured to enable operations performed by UCM broker 210 in conjunction with third-party systems 233.

Security (authentication & authorization) module 226 may be configured to perform one or more security or authentication operations, and message queue module 227 may be configured to temporarily store one or more incoming and/or outgoing messages. Within server platform 213, operating system and system services layer 228 may allow one or more modules 214-227 to be executed.

In some embodiments, server platform 213 may be configured to interact with a number of other servers 229 including, but not limited to, database management systems (DBMSs), file repositories, search engines, and real-time communication systems. Moreover, UCM broker 210 and UCM manager 225 may be configured to integrate and enhance third-party systems and services (e.g., Outlook®, Gmail®, Dropbox®, Box.net®, Google Cloud®, Amazon Web Services®, Salesforce®, Lync®, WebEx®, Live Meeting®) using a suitable protocol such as HTTP or Session Initiation Protocol (SIP).

For purposes of this disclosure, an IHS may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an IHS may be a personal computer (e.g., desktop or laptop), tablet computer, mobile device (e.g., Personal Digital Assistant (PDA) or smart phone), server (e.g., blade server or rack server), a network storage device, or any other suitable device and may vary in size, shape, performance, functionality, and price. An IHS may include Random Access Memory (RAM), one or more processing resources such as a Central Processing Unit (CPU) or hardware or software control logic, Read-Only Memory (ROM), and/or other types of nonvolatile memory.

Additional components of an IHS may include one or more disk drives, one or more network ports for communicating with external devices as well as various I/O devices, such as a keyboard, a mouse, touchscreen, and/or a video display. An IHS may also include one or more buses operable to transmit communications between the various hardware components.

Figure 3:
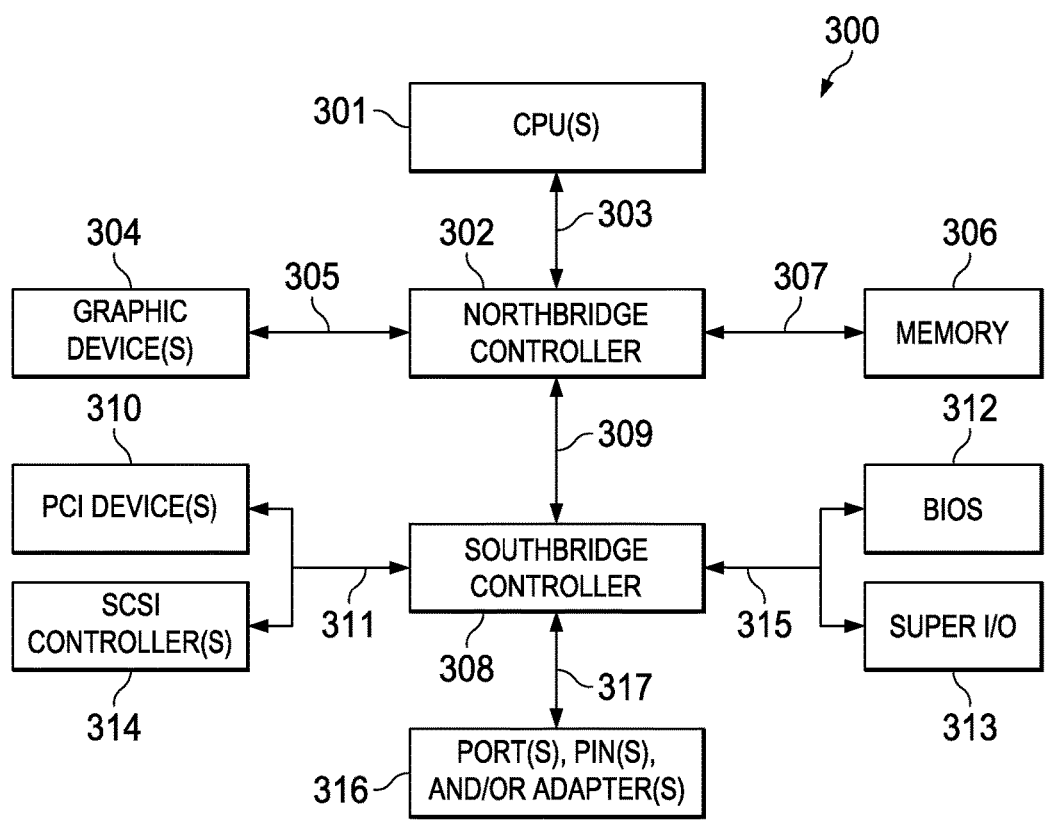
FIG. 3 is a block diagram of an example of an Information Handling System (IHS) according to some embodiments.

FIG. 3 is a block diagram of an example of an IHS. In some embodiments, IHS 300 may be used to implement any of computer systems or devices 101, 102A-N, and/or 105A-N. As shown, IHS 300 includes one or more CPUs 301. In various embodiments, IHS 300 may be a single-processor system including one CPU 301, or a multi-processor system including two or more CPUs 301 (e.g., two, four, eight, or any other suitable number). CPU(s) 301 may include any processor capable of executing program instructions. For example, in various embodiments, CPU(s) 301 may be general-purpose or embedded processors implementing any of a variety of Instruction Set Architectures (ISAs), such as the x86, POWERPC®, ARM®, SPARC®, or MIPS® ISAs, or any other suitable ISA. In multi-processor systems, each of CPU(s) 301 may commonly, but not necessarily, implement the same ISA.

CPU(s) 301 are coupled to northbridge controller or chipset 301 via front-side bus 303. Northbridge controller 302 may be configured to coordinate I/O traffic between CPU(s) 301 and other components. For example, in this particular implementation, northbridge controller 302 is coupled to graphics device(s) 304 (e.g., one or more video cards or adaptors) via graphics bus 305 (e.g., an Accelerated Graphics Port or AGP bus, a Peripheral Component Interconnect or PCI bus, or the like). Northbridge controller 302 is also coupled to system memory 306 via memory bus 307. Memory 306 may be configured to store program instructions and/or data accessible by CPU(s) 301. In various embodiments, memory 306 may be implemented using any suitable memory technology, such as static RAM (SRAM), synchronous dynamic RAM (SDRAM), nonvolatile/Flash-type memory, or any other type of memory.

Northbridge controller 302 is coupled to southbridge controller or chipset 308 via internal bus 309. Generally speaking, southbridge controller 308 may be configured to handle various of IHS 300's I/O operations, and it may provide interfaces such as, for instance, Universal Serial Bus (USB), audio, serial, parallel, Ethernet, or the like via port(s), pin(s), and/or adapter(s) 316 over bus 317. For example, southbridge controller 308 may be configured to allow data to be exchanged between IHS 300 and other devices, such as other IHSs attached to a network (e.g., network 104). In various embodiments, southbridge controller 308 may support communication via wired or wireless general data networks, such as any suitable type of Ethernet network, for example; via telecommunications/telephony networks such as analog voice networks or digital fiber communications networks; via storage area networks such as Fiber Channel SANs; or via any other suitable type of network and/or protocol.

Southbridge controller 308 may also enable connection to one or more keyboards, keypads, touch screens, scanning devices, voice or optical recognition devices, or any other devices suitable for entering or retrieving data. Multiple I/O devices may be present in IHS 300. In some embodiments, I/O devices may be separate from IHS 300 and may interact with IHS 300 through a wired or wireless connection. As shown, southbridge controller 308 is further coupled to one or more PCI devices 310 (e.g., modems, network cards, sound cards, or video cards) and to one or more SCSI controllers 314 via parallel bus 311. Southbridge controller 308 is also coupled to Basic I/O System (BIOS) 312 and to Super I/O Controller 313 via Low Pin Count (LPC) bus 315.

BIOS 312 includes non-volatile memory having program instructions stored thereon. Those instructions may be usable CPU(s) 301 to initialize and test other hardware components and/or to load an Operating System (OS) onto IHS 300. Super I/O Controller 313 combines interfaces for a variety of lower bandwidth or low data rate devices. Those devices may include, for example, floppy disks, parallel ports, keyboard and mouse, temperature sensor and fan speed monitoring/control, among others.

In some cases, IHS 300 may be configured to provide access to different types of computer-accessible media separate from memory 306. Generally speaking, a computer-accessible medium may include any tangible, non-transitory storage media or memory media such as electronic, magnetic, or optical media—e.g., magnetic disk, a hard drive, a CD/DVD-ROM, a Flash memory, etc. coupled to IHS 300 via northbridge controller 302 and/or southbridge controller 308.

The terms "tangible" and "non-transitory," as used herein, are intended to describe a computer-readable storage medium (or "memory") excluding propagating electromagnetic signals; but are not intended to otherwise limit the type of physical computer-readable storage device that is encompassed by the phrase computer-readable medium or memory. For instance, the terms "non-transitory computer readable medium" or "tangible memory" are intended to encompass types of storage devices that do not necessarily store information permanently, including, for example, RAM. Program instructions and data stored on a tangible computer-accessible storage medium in non-transitory form may afterwards be transmitted by transmission media or signals such as electrical, electromagnetic, or digital signals, which may be conveyed via a communication medium such as a network and/or a wireless link.

A person of ordinary skill in the art will appreciate that IHS 300 is merely illustrative and is not intended to limit the scope of the disclosure described herein. In particular, any computer system and/or device may include any combination of hardware or software capable of performing certain operations described herein. In addition, the operations performed by the illustrated components may, in some embodiments, be performed by fewer components or distributed across additional components. Similarly, in other embodiments, the operations of some of the illustrated components may not be performed and/or other additional operations may be available.

For example, in some implementations, northbridge controller 302 may be combined with southbridge controller 308, and/or be at least partially incorporated into CPU(s) 301. In other implementations, one or more of the devices or components shown in FIG. 3 may be absent, or one or more other components may be added. Accordingly, systems and methods described herein may be implemented or executed with other IHS configurations.

Virtual Collaboration Application

In various embodiments, the virtual collaboration architecture described above may be used to implement a number of systems and methods in the form of virtual collaboration application 230 shown in FIG. 2. These systems and methods may be related to meeting management, shared workspace (e.g., folder sharing control, remote desktop, or application sharing), digital whiteboard (e.g., collaboration arbitration, boundary, or light curtain based input recognition), and/or personal engagement (e.g., attention loss detection, eye tracking, etc.), some of which are summarized below and explained in more detail in subsequent section(s).

For example, virtual collaboration application 230 may implement systems and/or methods for managing public and private information in a collaboration session. Both public and private portions of a virtual collaboration workspace may be incorporated into the same window of a graphical user interface. Meeting/project content in the public and private portions may include documents, email, discussion threads, meeting minutes, whiteboard drawings, lists of participants and their status, and calendar events. Tasks that may be performed using the workspace include, but are not limited to, editing of documents, presentation of slides, whiteboard drawing, and instant messaging with remote participants.

Additionally or alternatively, virtual collaboration application 230 may implement systems and/or methods for real-time moderation of content sharing to enable the dynamic moderating of participation in a shared workspace during a meeting. Combining a contact list alongside the shared workspace and folder system in one simplified and integrated User Interface (UI) puts all input and outputs in one window so users simply drag and drop content, in-session workspace tabs, and people to and from each other to control access rights and share. Behavior rules dictating actions may be based on source and destination for drag and drop of content and user names. Actions may differ depending on whether destination is the real-time workspace or file repository. Also, these systems and methods provide aggregation of real-time workspace (whiteboard/presentation area) with file repository and meeting participant lists in one UI.

Additionally or alternatively, virtual collaboration application 230 may implement systems and/or methods for correlating stroke drawings to audio. Such systems and methods may be configured to correlate participants' audio and drawing input by synchronization of event triggers on a given device(s). As input is received (drawing, speech, or both), the data are correlated via time synchronization, packaged together, and persisted on a backend system, which provides remote synchronous and asynchronous viewing and playback features for connected clients. The data streams result in a series of layered inputs that link together the correlated audio and visual (sketches). This allows participants to revisit previous collaboration settings. Not only can a user playback the session in its entirety, each drawing layer and corresponding audio can be reviewed non-linearly.

Additionally or alternatively, virtual collaboration application 230 may implement systems and/or methods for live speech-to-text broadcast communication. Such systems and methods may be configured to employ Automatic Speech Recognition (ASR) technology combined with a client-server model and in order to synchronize the converted speech's text transcript for real-time viewing and later audio playback within a scrolling marquee (e.g., "news ticker"). In conjunction with the converted speech's text the audio data of the speech itself is persisted on a backend system, it may provide remote synchronous and asynchronous viewing and playback features for connected clients.

Additionally or alternatively, virtual collaboration application 230 may implement systems and/or methods for dynamic whiteboarding drawing area. In some cases, a virtual border may be developed around the center of a user's cursor as soon as that user starts to draw in a shared whiteboard space. The border may simulate the physical space that the user would block in front of a traditional wall-mounted whiteboard and is represented to all session participants as a color-coded shaded area or outline, for example. It provides dynamic virtual border for reserving drawing space with automatic inactivity time out and resolution with other borders, as well as moderation control of a subset of total available area, allowing border owner to invite others to draw in their temporary space, and the ability to save subsets of a digital whiteboard for longer periods of time.

Additionally or alternatively, virtual collaboration application 230 may implement systems and/or methods for coaching users on engagement in meetings and desk work. These systems and methods may be configured to measure a user's activity and to feedback relevant information regarding their current level of engagement. Sensors may detect activity including facial movements, gestures, spoken audio, and/or application use. Resulting data may be analyzed and ranked with priority scores to create statistics such as average speaking time and time spent looking away from screen. As such, these systems and methods may be used to provide contextual feedback in a collaborative setting to monitor and to improve worker effectiveness, ability to set goals for improvement over time, such as increased presence in meetings and reduced time spent on low-priority activities, combined monitoring of device and environmental activity to adapt metrics reported based on user's context, and ability for user to extend to general productivity improvement.

Additionally or alternatively, virtual collaboration application 230 may implement systems and/or methods for automated tracking of meeting behavior and optimization over time. Such systems and methods may act as a planning tool configured to leverage device sensors, user calendars, and/or note-taking applications to track user behavior in meetings and suggest optimizations over time to increase overall effectiveness. As such, these systems and methods may leverage device proximity awareness to automatically track user attendance in scheduled meetings over time and/or use ASR to determine participation levels and mood of meetings (e.g., assess whether attendance is too high, too low, and general logistics).

Additionally or alternatively, virtual collaboration application 230 may implement systems and/or methods for managing meeting or meeting topic time limits in a distributed environment. A meeting host service may provide controlled timing and notification of meeting events through use of contextual information such as speaker identification, key word tracking, and/or detection of meeting participants through proximity. Meeting host and individual participants may be notified of time remaining prior to exceeding time limits. Examples include, but are not limited to, time remaining for (current) topic and exceeding preset time-to-talk limit. In some cases, these systems and methods may be configured to perform aggregation of contextual data with traditional calendar, contact, and agenda information to create unique meeting events such as identifying participants present at start and end of meeting (e.g., through device proximity). Such systems and methods may also be configured to use of contextual data for dynamic management of meeting timing and flow in a distributed environment, and to provide contextual-based feedback mechanism to individuals such as exceeding preset time-to-talk.

Additionally or alternatively, virtual collaboration application 230 may implement systems and/or methods for enhanced trust relations based on peer-to-peer (P2P) direct communications. In many situations people whom have not met in person may be in communication with each other via email, instant messages (IMs), and through social media. With the emerging P2P direct communications, face-to-face communication may be used as an out-of-band peer authentication ("we have met"). By attaching this attribute in a user's contact list, when the user is contacted by other people whose contact information indicates that they have interacted face-to-face, these systems and methods may provide the user a higher level of trust.

Additionally or alternatively, virtual collaboration application 230 may implement systems and/or methods for a gesture enhanced interactive whiteboard. Traditional digital whiteboard uses object size and motion to detect if a user intending to draw on the board or erase a section of the board. This feature can have unintended consequences, such as interpreting pointing as drawing. To address this, and other concerns, these systems and methods may augment the traditional whiteboard drawing/erase detection mechanism, such as light curtain, with gesture recognition system that can track the user's face orientation, gaze and/or wrist articulation to discern user intent.

Additionally or alternatively, virtual collaboration application 230 may implement systems and/or methods for hand raise gesture to indicate needing turn to speak. It has become very commonplace to have remote workers who participate in conference call meetings. One key pain point for remote workers is letting others know that they wish to speak, especially if there are many participants engaged in active discussion in a meeting room with a handful or few remote workers on the conference call. Accordingly, these systems and methods may interpret and raise gesture that is detected by a laptop web cam as automatically indicating to meeting participants that a remote worker needs or wants a turn to speak.

Additionally or alternatively, virtual collaboration application 230 may implement systems and/or methods for providing visual audio quality cues for conference calls. One key pain point anyone who has attended conference calls can attest to is poor audio quality on the conference bridge. More often than not, this poor audio experience is due to background noise introduced by one (or several) of the participants. It is often the case that the specific person causing the bridge noise is at the same time not listening to even know they are causing disruption of the conference. Accordingly, these systems and methods may provide a visual cue of audio quality of speaker (e.g., loudness of speaker, background noise, latency, green/yellow/red of Mean opinion score (MOS)), automated identification of noise makers (e.g., moderator view and private identification to speaker), and/or auto muting/filtering of noise makers (e.g., eating sounds, keyboard typing, dog barking, baby screaming).

Managing Engagement During Virtual Collaboration Session

Computing devices such as PCs, tablets and phones provide significant productivity benefits in the workplace, but these same devices can also create distractions. For example, meeting participants are often drawn into non-relevant email and users can easily get sidetracked with web surfing during desk work. These many potential distractions can result in a negative perception among colleagues over time, especially when they reduce direct engagement in meetings and virtual collaboration session.

Remote workers face a unique challenge of maintaining engagement and positive perception among coworkers because of their ability to multi-task during audio conference calls. Substantial periods of time can elapse with distractions and limited engagement because a remote participant lacks the benefit of non-verbal cues to help make them aware of their behavior. Moreover, a perception of disengagement can have adverse effects on any worker's value to their team and longer term standing in their organization. The impact is arguably greatest for remote workers, and fear of losing touch, not providing value-added, and not being considered an equal are documented roadblocks preventing more businesses from reaping the benefits of a distributed workforce.

To address these concerns, certain systems and methods described herein may enable the metering of a user's activity via a variety of sensors or the like, and may provide relevant information to that user regarding his or her current level of engagement. These sensors may be configured to detect activity including, but not limited to, facial movements, gestures, spoken audio, application use, and device inputs. These data are analyzed and ranked with priority scores based on context and/or user settings. Resulting statistics such as average speaking time (when in a meeting or on a call), time spent looking at or away from the screen, time focused on a non-relevant application, and/or time spent away from the computer entirely are presented discretely back to the user for their benefit.

For example, for typical desk work, a user can leverage the service to maintain focus and minimize time spent doing non-essential activities. In co-located meetings, users can benefit from feedback when they are spending too much time doing email or web surfing. For remote workers on audio conference calls, the service may provide feedback on their level of engagement including the perception they are creating with their remote colleagues who cannot see their non-verbal cues.

In some embodiments, these systems and methods may be implemented as a service that may be set to be maximized at all times or stay in the background, for instance, until a minimum threshold for a particular metric is exceeded. Additionally, a user may set goals to improve focus over time. Examples include being more vocal in meetings, avoiding monopolization of time by speaking too much, reducing time spent doing non-relevant email in meetings, or reducing time spent surfing the web at the desk.

Broadly speaking, two categories of monitoring include "device activity" and "environmental activity." Device activity tracks activity between the user and their system, such as what applications are open and what inputs are being made. For example, by tracking device activity a system may be capable of detecting the surfing of web sites and reading email that has nothing to do with a discussion topic. Conversely, environmental activity may be detected with NUI module 205, such as face/eye tracking and/or voice interaction to sense activities such as speaking time and periods spent away from the computer entirely.

In some implementations, the systems and methods described herein may be aware of context and may adapt how the metrics are reported based on the user's task. For example, if the user is in a meeting with other people (e.g., same-time, same-place), it is generally positive when that user looks away from the screen, whereas if a user is dialing into a meeting from a remote location (e.g., same-time, different-place) it is generally positive for the user to look at the screen with a Unified Communication (UC) session maximized. In all meetings it is a generally positive to be actively speaking, compared to when conducting desk work.

An example of context sensing includes recognizing words in spoken conversation and comparing those recognized words to text being typed into a note taking application. In that case, the service may not treat the activity as disengagement given that the context is relevant. Another example of advanced use of context includes prioritizing active speaking engagement over being in front of the screen if a user prefers to walk around their home office while on a conference call, as selected in a preferences setting or the like.

In some embodiments, certain positive engagement activities may increase the overall score such as, for instance, taking notes or viewing meeting material (device activity). Participating in meeting discussions or physically looking at shared meeting workspace may also increase the score (NUI activity). In contrast, negative engagement activities that may decrease the score include reading unrelated email or surfing web on unrelated topic (device activity) or not taking any action for ambiguous activities, such as simply not looking at the screen (NUI activity). In some cases, no positive engagement activities over some time period may also decrease the engagement score.

In some cases, these systems and methods may be used as a personal coach. As such, the metrics and feedback generated may not be intended for public knowledge and consumption, as disseminating the information among team members or the public may have a negative impact on adoption.

In some embodiments, a method for managing behavior in a virtual collaboration session may include receiving engagement metrics from each individual participant of a virtual collaboration session, where the engagement metrics are indicative of that participant's level of engagement in the virtual collaboration session. The method may also include calculating a score based upon the engagement metrics and providing the score to each participant. In some embodiments, a service employing such a method may provide the ability to show trending from past activity for each metric or summarize all metrics into an overall engagement score.

Examples of engagement metrics include, when in a meeting, time spent with a laptop screen open, time spent looking at screen (phone, tablet, laptop, etc.), talk time, and/or time spent typing words not related to the discussion. With respect to the latter, a method may be configured to cross check typed keywords to conversation during the session to help distinguish situations when a participant is taking notes relevant to the session or multi-tasking on other projects. When in a conference call, engagement metrics may include talk time, time spent away from screen, time spent with other windows open, etc. Further, when the participant is at his or her desk, engagement metrics may include, for example, time spent web surfing items unrelated to the session, time spent on personal email, social networking, etc.

In some cases, a user may choose to receive an overall score or may set triggers for certain metrics based on prior feedback or personal goals. Additionally or alternatively, the score may default to equal weight by metric or the user may choose each weight depending on his or her personal goals.

In that regard, FIGS. 4 and 5 are screenshots illustrating examples of individual engagement data according to some embodiments. Screenshot 400 shows a situation where an individual participant's engagement metrics include speaking time 401, UC window maximization 402, email 403, and time away from PC 404. Assume, in this example, that the participant is a remote worker dialing into a meeting, and that the participant wishes to ensure that their voice is heard, and that they are not multitasking too much or walking away entirely. For each metric, a shaded portion of the horizontal line or bar indicates intervals when the corresponding activity was detected during the session, as well as a percentage of the time the user spent on that particular activity. An indication of a total, overall engagement score 405 may be provided along with an indication of whether the current score is higher or lower than a previous score or average.

As the virtual session progresses, score 405 may be reduced based, at least in part, upon a lack of a selected engagement activity for a predetermined period of time. Additionally or alternatively, score 405 may be increased based, at least in part, upon an improvement of a selected engagement activity for a predetermined period of time.

In some cases, score 405 may be a weighted sum of engagement metrics 401-404 using a weight value assigned to each such metric. These weight values may be preset, selected by a session organizer, or selected by each individual participant. Additionally or alternatively, weight values may be assigned to an engagement metric depending upon context. For example, if a participant is physically disposed in proximity to another participant of the virtual collaboration session, looking away from the device's screen and toward the other participant does not necessary represent a negative or disengaged interaction. As another example, if a participant has typed a keyword into an application that has been spoken during the virtual collaboration session, such an action may also represent a positive or engaged activity.

FIG. 5 is generally similar to FIG. 4, but screenshot 500 shows another individual participant's engagement metrics include speaking time 501, email 502, web browsing 503, and engagement score 504. Here, assume that the participant is a worker meeting with others in a conference room. As was the case with the remote worker, here the local participant is also concerned about having his voice heard, but he has a tendency to email too much during meetings. Note that the participant tends to use email much of the time and only breaks to talk. As such, the participant may use the tool to become aware of these habits and sets goals to improve over time. Also, it should be noted that in this example both the participant of screenshot 400 and the participant of screenshot 500 may be attending the same session, but each individual may have selected a different set of metrics to be considered. In other words, a participant may change a metric or a metric's weight depending upon the participant's personal preference for prioritizing a first activity over a second activity.

In some cases, screenshots 400 and/or 500 may be presented to a user in real-time during the entire virtual collaboration session. In other cases, engagement calculations may be performed as a background process and, in response to a determination that an engagement metric has reached a corresponding, configurable threshold value, screenshots 400 and/or 500 may be presented to the respective user.

Figure 6:
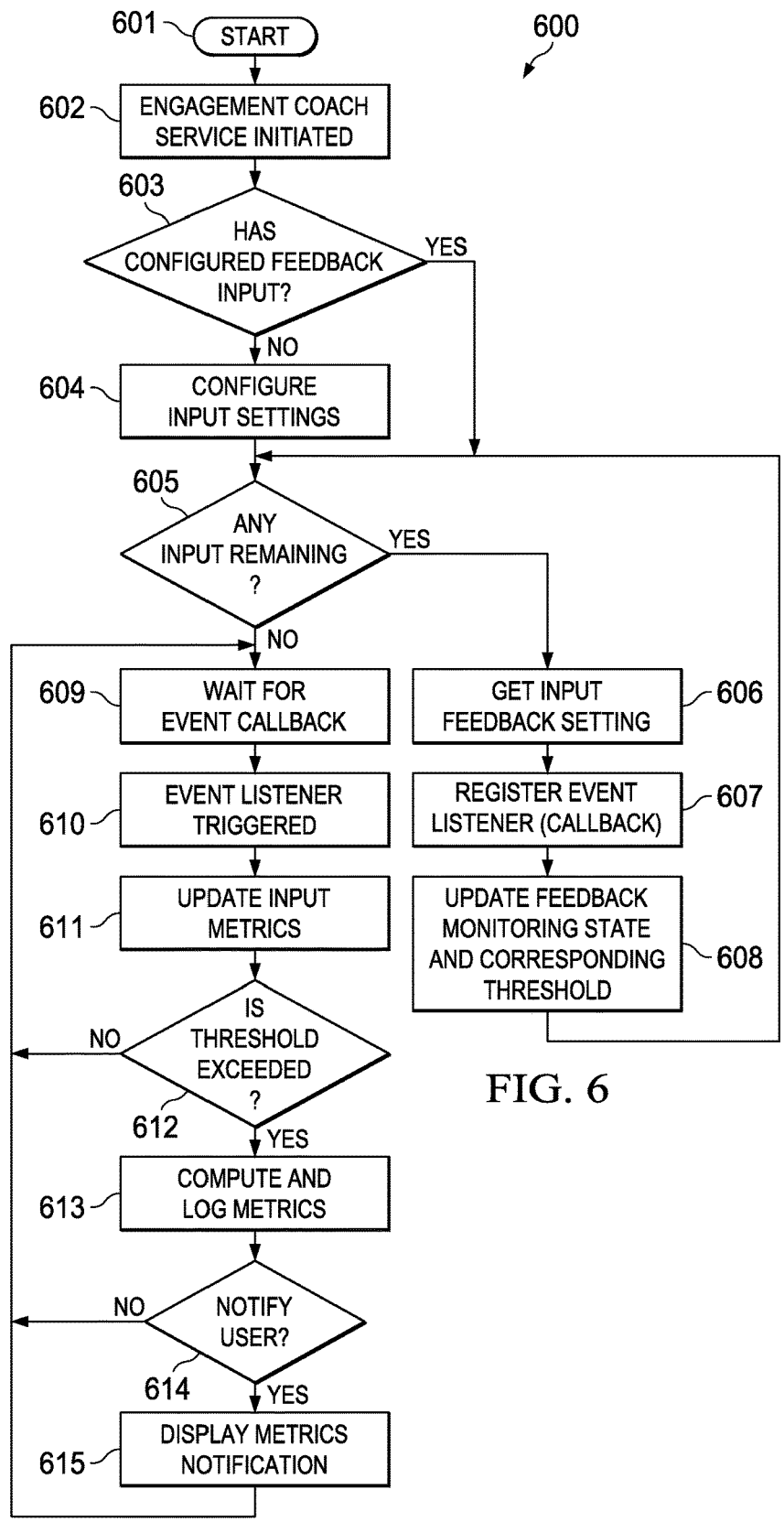
FIG. 6 is a flowchart of a method for collecting and manipulating engagement data according to some embodiments.

FIG. 6 is a flowchart of a method for collecting and manipulating engagement data. In some embodiments, method 600 may be performed, at least in part, by web browser or native application 201 and/or application server or web services 212 shown in FIG. 2. Particularly, method 600 begins at block 601. At block 602, method 600 includes initiating an engagement coach service. Block 603 determines whether feedback input has been configured. If not, the participant may configure personal settings at block 604. Otherwise method 600 progresses to block 605.

Block 605 determines whether there is any input remaining. If so, the participant may provide input feedback setting, such as weight value for a given engagement metric, etc. at block 606, block 607 registers the event listener (callback), and block 608 updates the feedback monitoring state and corresponding threshold value. When there are no further inputs remaining, method 600 progresses to block 609, where it waits for event callback.

An event listener is triggered at block 610, block 611 updates input metrics, and block 612 determines if a threshold is exceed for any given metric. If not, control returns to block 609. Otherwise metrics are computed and logged at block 613. At block 614, method 600 determines whether to notify the participant. If so, it displays metric notifications (e.g., screenshots 400/500) at block 615, otherwise control again returns to block 609.

Coaching of Session Organizers or Initiators

In some embodiments, anonymous data from the aforementioned individual engagement metrics may be combined or aggregated with additional data collected from team engagement metrics to provide coaching for meeting or session organizers or initiators to provide suggestions that aim to improve effectiveness over time.

Examples of team engagement metrics include, but are not limited to, late arrivals, participation rate over time, rat holes (when a conversation stays on the same topic for a long time), a measure of overall tone based on number of people speaking at once (i.e., over each other), tone in participant's voices, time spent on each slide presented during the meeting (gives an idea of where the focus was), the number of times meetings had no agenda, completion rate for agenda, number of planned topics that were actually covered during a given session, exceeding time planned, capture rate of actions and decisions, and completion rate of actions. Examples of suggestions include, but are not limited to, suggestions to increase/decrease meeting frequency or duration, to take advantage of documentation tools such as automated minutes, actions, decisions, to engage between meetings to improve follow-through on actions and decisions, or to use alternatives to meetings for certain tasks (e.g., asynchronous collaboration site).

Figure 7:
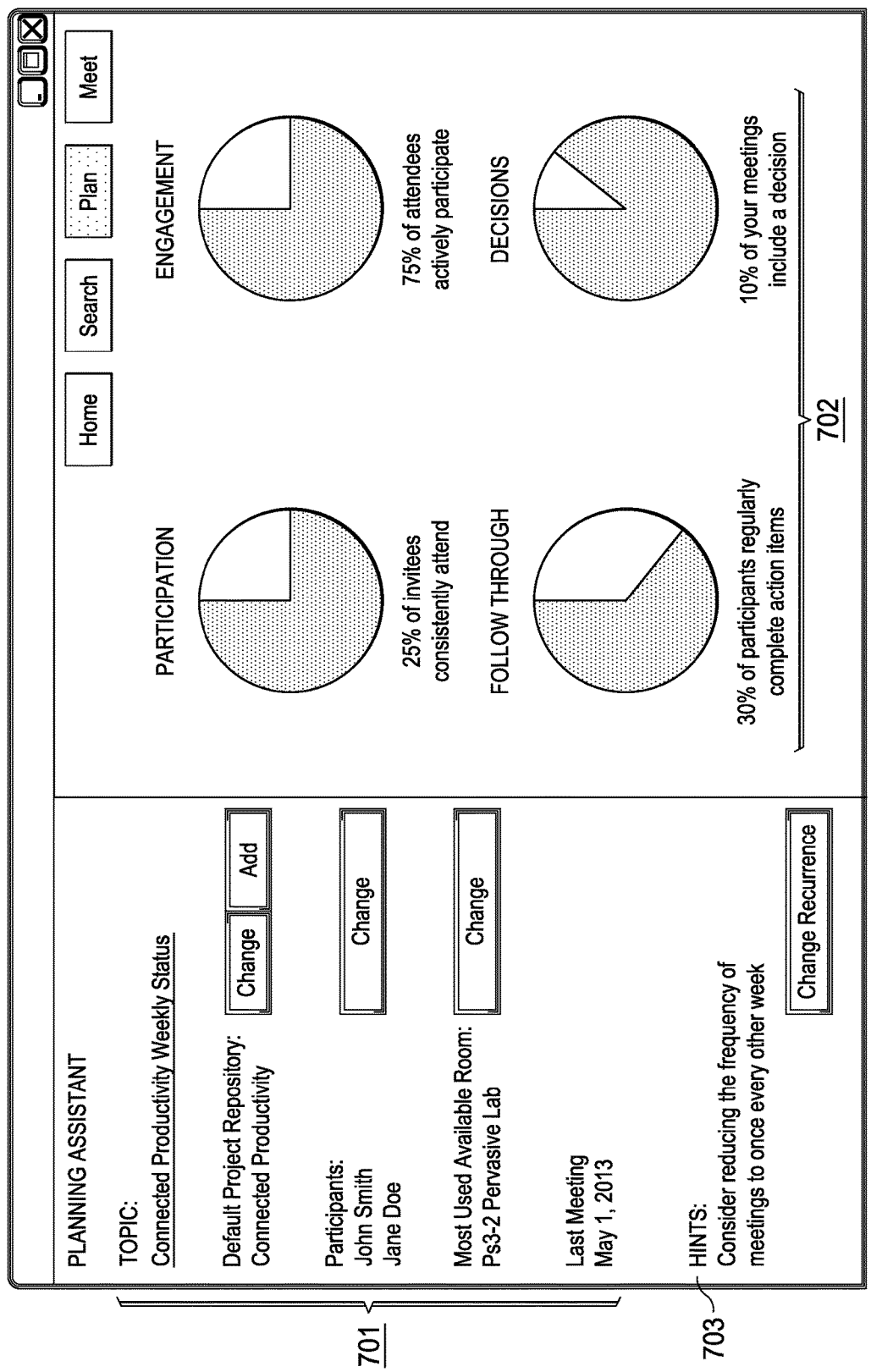
FIG. 7 is a screenshot illustrating an example of coaching of session organizers according to some embodiments.

FIG. 7 is a screenshot illustrating the coaching of session organizers according to some embodiments. Specifically, portion 701 of screenshot 700 shows information about a particular virtual collaboration session including the topic, the default project repository (here named "Connected Productivity," a list of participants, an indication of the most used conference room that is available, and the date of the last meeting.

Portion 702 of screenshot 700 shows overall metrics regarding participation, engagement, follow through, and decisions. In this case, participation data indicates that 25% of invitees consistently attend sessions, engagement data indicates that 75% of attendees actively participate in sessions, follow through data indicates that 30% of participants regularly complete action items, and decision data indicates that 10% of sessions include a decision made during the session. Meanwhile, portion 703 indicates a suggestion that the meeting organizer consider reducing the frequency of sessions to once every other week. In some cases, suggestion 703 may be reached based upon an automated analysis of data shown in portion 702, each of which may have its own assigned weight (similarly as with purely individual engagement metrics).

Virtual Collaboration Session Time Limits

During a small group meeting or collaboration session, typical issues for meeting participants are losing track of total meeting time and/or devoting too much time to a particular topic. While the responsibility for time management is generally assigned to the meeting presenter or the meeting coordinator, in the case of ad hoc or highly interactive meetings, control of the discussion is generally distributed. Meeting control, in fact, can become further distributed with the addition of remote participants.

As control of the meeting becomes more distributed, participants may have differing—if not inaccurate—views of either the total meeting time, the remaining time in a meeting, or the amount of time to devote to a specific topic. These different views of time can cause confusion and loss of meeting effectiveness if the meeting participants lose control of overall time management. This productivity loss can be extreme as participants accidentally or consciously exceed time limits, resulting in topics not discussed or addressed, or overall goals for the meeting not being met.

To address these concerns, systems and methods disclosed herein may improve the management of meeting time and meeting events in a distributed work environment. In some cases, a meeting host such as server platform 213 may include timer(s) coupled with an integrated user interface (UI), accessible through touch or gesture, hosted from a computing device such as an interactive projector, PC or tablet, and accessible on client devices used by both in-room and remote meeting participants.

In some implementations, context engine 206 may provide contextual input, including proximity detection of meeting participants and speaker/keyword identification. Inputs to the context engine may include meeting calendar and agenda information (from calendaring module 216), meeting settings (from meeting management module 214), and contact list, which are accessible through the meeting host UI. Voice service 219 may be configured to provide identification of speakers through individual, authenticated, dedicated channels, such as a directional microphone on a compute device or a VoIP Session Initiation Protocol (SIP) connection.

Figure 8:
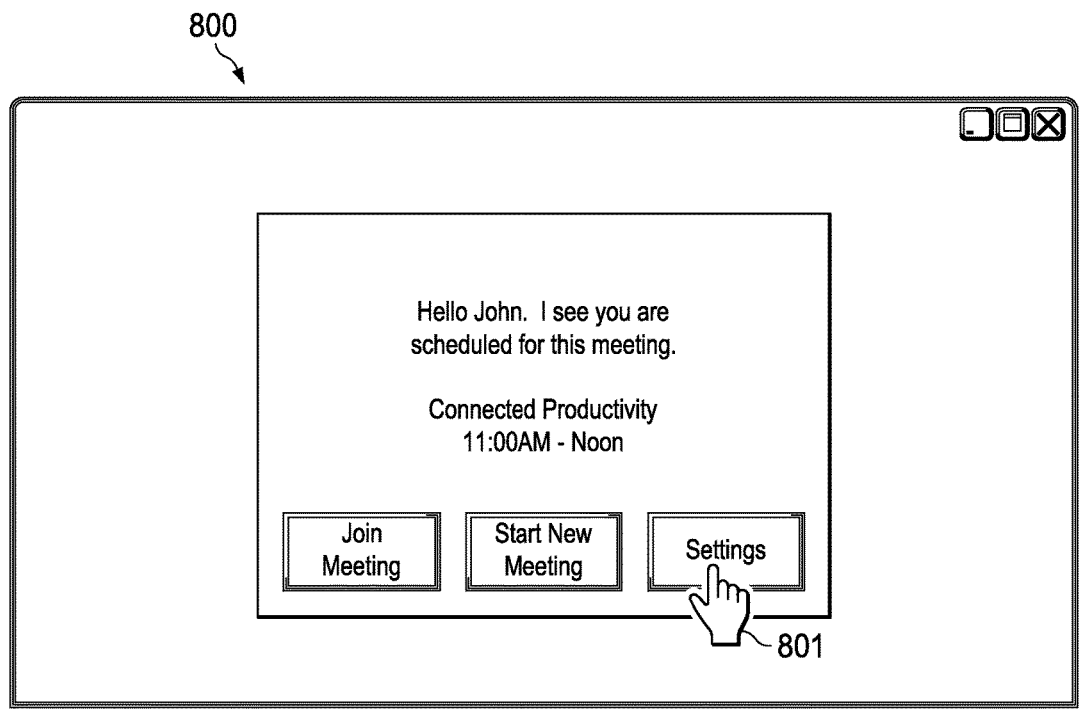
FIGS. 8 and 9 are screenshots illustrating the management of session and/or topic time limits according to some embodiments.
Figure 9:
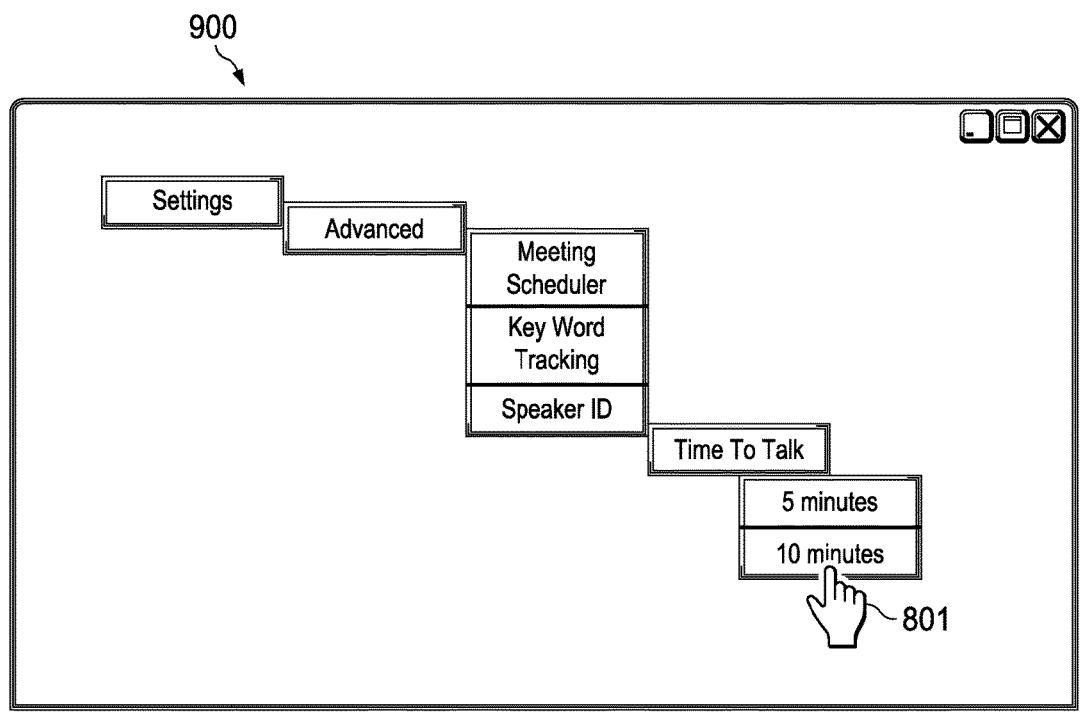

In some cases, a service may be invoked by a user(s) serving as the meeting or session initiator. The meeting initiator can make use of the meeting host computing device to access the user interfaces, prior to or at the start of a meeting, and to select options for meeting timing events. To illustrate this, FIGS. 8 and 9 are screenshots illustrating systems for managing session and/or topic time limits according to some embodiments. In FIG. 8, screenshot 800 shows a user interface displayed to a meeting initiator 801, which includes controls for joining a meeting, starting a new meetings, or entering settings for a meeting.

In FIG. 9, screenshot 900 shows an example of hierarchical settings selectable by initiator 801. In this example, advanced settings include a meeting scheduler, keyword tracking, or speaker identification. These settings may range from timing events (e.g., post countdown to scheduled meeting-end with variable interval setting) to context driven events. For instance, the meeting schedule setting may allow the initiator to set a hard-stop indicator whereby the timing engine makes use of meeting information provided by the calendaring tool to warn either the initiator or any participant of upcoming hard-stop events, such as the imminent losing of the meeting room or the start of a subsequent higher priority event. In some cases, however, the initiator may also be warned of other, non-hard-stop events such as, for example, certain preselected meeting warnings, personal coaching suggestions being issued (e.g., a warning when time spent on a specific slide, which indicative time spent on a single topic, is about to be exceeded), etc.

In some cases, the meeting schedule setting may also include an end-of-topic warning feature whereby the timing engine makes use of agenda information provided by calendaring to enforce time limits for individual topics. Tracking of individual topic transitions for timing purposes may enforced, for example, by pre-tagging presentation slides with "topic tag-words" that are detectable through the meeting host UI or by pre-assigning key words to topics that may be matched through automatic speech recognition or similar techniques.

The keyword tracking setting may be configurable to allow the tracking of repetitive keywords and to proactively present a warning when a threshold amount of keyword usage is reached or exceeded (e.g., "meeting time limit at risk"). In some cases, tracking keywords that are selected for their relationship to specific topics may provide an indication that too much discussion has been spent on a given topic. Additionally or alternatively, the absence of specific keywords can be used as an indication that a high priority topic has not been covered. Also, keywords may be assigned by a meeting initiator, may be automatically collected from agenda/topic list, or from a list logged from previous but related virtual collaboration session. Moreover, threshold usage may be set for total meeting time or per meeting topic.

The speaker ID option allows the initiator to select a time-to-talk (TTT) feature, whereby initiator may select a predetermined amount of time to be allocated to a particular speaker or session participant. A notification may then be provided to warn a meeting initiator or the speaker when the limit is about to be reached.

Once the meeting initiator has started the meeting, timing control is passed to the meeting host. The meeting host makes use of set-up options, meeting information and context to post warnings when time limits are about to be exceeded. The meeting initiator may interrupt the meeting host through the user interface to move to end the meeting, to move to the next topic or to change meeting settings.

Figure 10:
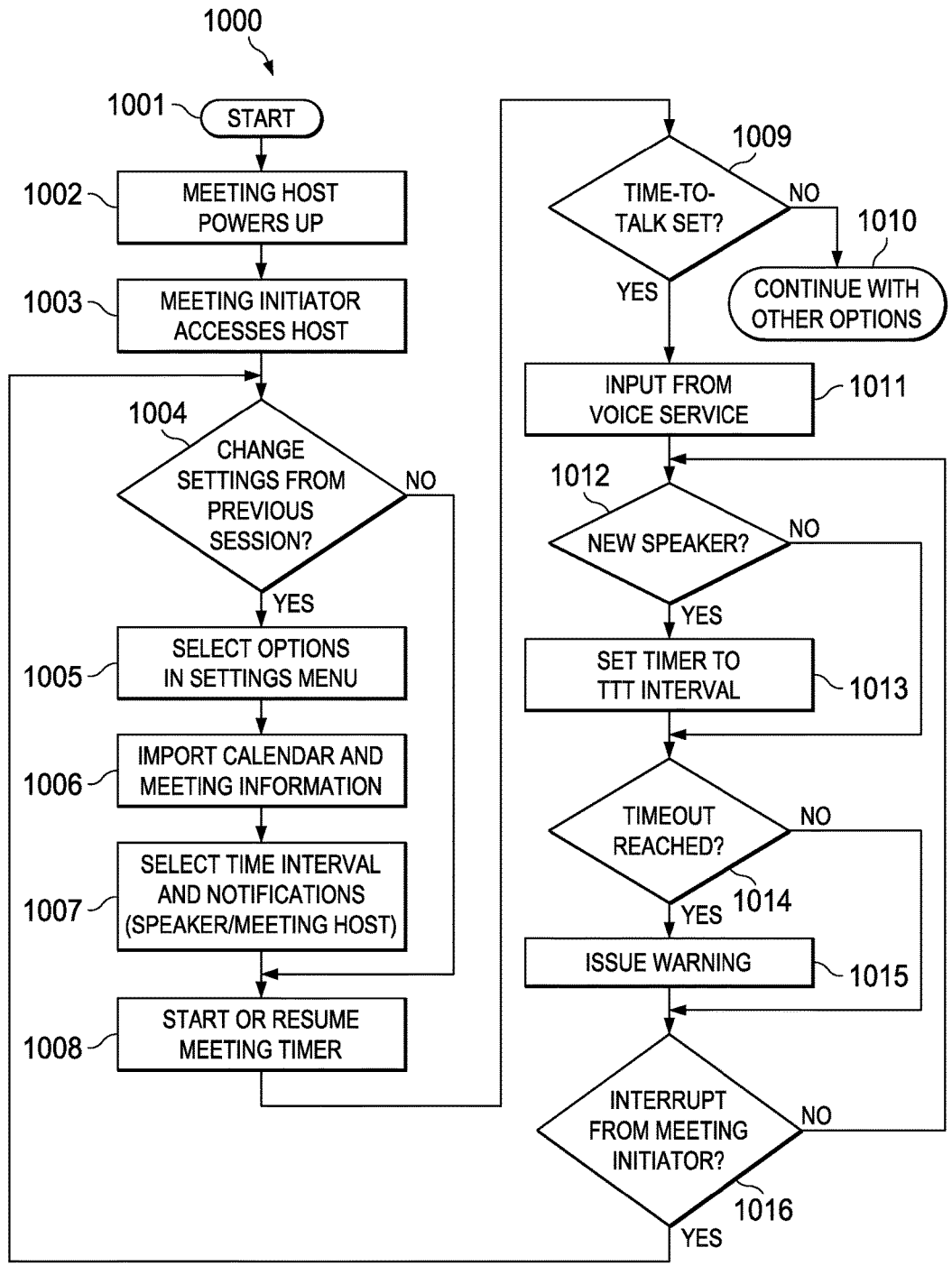
FIG. 10 is a flowchart of a method of managing session and/or topic time limits according to some embodiments.

FIG. 10 is a flowchart of a method of managing session and/or topic time limits. In some embodiments, method 1000 may be performed, at least in part, by web browser or native application 201 and/or application server or web services 212 shown in FIG. 2. As shown, method 1000 may be used to aid in meeting set-up and time-limit warning for a time-to-talk implementation. Particularly, method 1000 provides an objective time reference, configurable through in-room tools, whose output is accessible to all meeting participants, in-room and remote, available for tracking and notification of time limits reached.

Method 1000 begins at block 1001. At block 1002, the meeting or session host powers up, and at block 1003 a meeting or session initiator access the host. Block 1004 allows the initiator to change or maintain settings from a previous session. If the initiator does not wish to change any settings, control passes to block 1008. Otherwise, at block 1005, the initiator may select options via an options or settings menu. Block 1006 imports calendar and meeting information, and block 1007 selects time interval and notifications. At block 1008, a meeting timer is started or resumed.

Block 1009 determines whether a time-to-talk option has been set. If not, block 1010 allows the initiator to select other options. Otherwise block 1011 receives input from a voice service, for example, during the virtual collaboration session. If the speaker is determined to be new at block 1012, block 1013 sets a timer to the selected time-to-talk interval. At block 1014, if a timeout has been reached, block 1015 issues a warning. If at block 1016 the meeting initiator interrupts the speaker, control returns to block 1004; otherwise control returns to block 1012.

It should be understood that various operations described herein may be implemented in software executed by logic or processing circuitry, hardware, or a combination thereof. The order in which each operation of a given method is performed may be changed, and various operations may be added, reordered, combined, omitted, modified, etc. It is intended that the invention(s) described herein embrace all such modifications and changes and, accordingly, the above description should be regarded in an illustrative rather than a restrictive sense.

Although the invention(s) is/are described herein with reference to specific embodiments, various modifications and changes can be made without departing from the scope of the present invention(s), as set forth in the claims below. Accordingly, the specification and figures are to be regarded in an illustrative rather than a restrictive sense, and all such modifications are intended to be included within the scope of the present invention(s). Any benefits, advantages, or solutions to problems that are described herein with regard to specific embodiments are not intended to be construed as a critical, required, or essential feature or element of any or all the claims.

Unless stated otherwise, terms such as "first" and "second" are used to arbitrarily distinguish between the elements such terms describe. Thus, these terms are not necessarily intended to indicate temporal or other prioritization of such elements. The terms "coupled" or "operably coupled" are defined as connected, although not necessarily directly, and not necessarily mechanically. The terms "a" and "an" are defined as one or more unless stated otherwise. The terms "comprise" (and any form of comprise, such as "comprises" and "comprising"), "have" (and any form of have, such as "has" and "having"), "include" (and any form of include, such as "includes" and "including") and "contain" (and any form of contain, such as "contains" and "containing") are open-ended linking verbs. As a result, a system, device, or apparatus that "comprises," "has," "includes" or "contains" one or more elements possesses those one or more elements but is not limited to possessing only those one or more elements. Similarly, a method or process that "comprises," "has," "includes" or "contains" one or more operations possesses those one or more operations but is not limited to possessing only those one or more operations.

The invention claimed is:

1. An Information Handling System (IHS), comprising:
a processor;
a hardware sensor coupled to the processor; and
a memory coupled to the processor, the memory including program instructions stored thereon that, upon execution by the processor, cause the IHS to:

receive engagement metrics from a participant of a virtual collaboration session, wherein the engagement metrics are indicative of the participant's level of engagement in the virtual collaboration session;

calculate a score based upon a weighted sum of the engagement metrics using a weight value assigned to each engagement metric;

determine, using the hardware sensor, a proximity of the participant with respect to another participant of the virtual collaboration session;

change a weight value assigned to an engagement metric depending upon the proximity;

change another weight value assigned to another engagement metric depending upon whether the participant has typed a keyword that has been spoken during the virtual collaboration session;

re-calculate the score using the changed weight value and the changed another weight value; and in response to the re-calculated score meeting a threshold value that indicates the participant has disengaged from the virtual collaboration session, increase a duration of the virtual collaboration session.

2. The IHS of claim 1, wherein the engagement metrics are determined based upon data selected from the group consisting of: a number of software applications being executed by a participant's device during the virtual collaboration session, an identity of the software applications being executed by the participant's device during the virtual collaboration session, an amount of web surfing performed by the participant during the virtual collaboration session, and an amount of email reading performed by the participant during the virtual collaboration session.

3. The IHS of claim 1, wherein the engagement metrics are determined based upon data selected from the group consisting of: facial movement of the participant during the virtual collaboration session, gestures made by the participant during the virtual collaboration session, eye movement of the participant during the virtual collaboration session, and voice interaction by the participant during the virtual collaboration session.

4. The IHS of claim 1, wherein the program instructions, upon execution by the processor, further cause the IHS to select one or more of the engagement metrics to calculate the score depending upon a context where the participant is found during the virtual collaboration session, and wherein the context includes an in-person meeting or a remote meeting.

5. The IHS of claim 1, wherein the receiving and calculating are performed as a background process, and wherein the providing occurs in response to a determination that an engagement metric has reached a corresponding threshold value.

6. The IHS of claim 1, wherein the engagement metric is determined based upon facial movement during the virtual collaboration session.

7. The IHS of claim 1, wherein the program instructions, upon execution by the processor, further cause the IHS to allow the participant to change a weight value assigned to an engagement metric depending upon the participant's personal preference for prioritizing a first activity over a second activity.

8. The IHS of claim 1, wherein the program instructions, upon execution by the processor, further cause the IHS to: (a) increase the score based, at least in part, upon an improvement of a selected engagement activity for a predetermined period of time; or (b) reduce the score based, at least in part, upon a lack of a selected engagement activity for a predetermined period of time.

9. A method, comprising:
receiving, at an Information Handling System (IHS) configured to host a virtual collaboration session among a plurality of participants, engagement metrics indicative of a participant's level of engagement in the virtual collaboration session;

calculating a score based upon a weighted sum of the engagement metrics using a weight value assigned to each engagement metric;

determining, using a hardware sensor coupled to the IHS, a proximity of the participant with respect to another participant of the virtual collaboration session;

changing a weight value assigned to an engagement metric depending upon the proximity;

changing the weight value depending upon whether the participant has typed a keyword that has been spoken during the virtual collaboration session; and re-calculating the score using the changed weight value and the changed another weight value; and in response to the re-calculated score meeting a threshold value that indicates the participant has disengaged from the virtual collaboration session, reducing a duration of the virtual collaboration session.

10. The method of claim 9, further comprising selecting one or more of the engagement metrics to calculate the score depending upon a context where the participant is found during the virtual collaboration session, wherein the context includes an in-person meeting or a remote meeting.

11. The method of claim 9, further comprising allowing the participant to change a weight value assigned to an engagement metric depending upon the participant's personal preference for prioritizing a first activity over a second activity.

12. The method of claim 9, further comprising: (a) increasing the score based, at least in part, upon an improvement of a selected engagement activity for a predetermined period of time; or (b) reducing the score based, at least in part, upon a lack of a selected engagement activity for a predetermined period of time.

13. A hardware memory device having program instructions stored thereon that, upon execution by an Information Handling System (IHS), cause the IHS to:
receive engagement metrics from a participant of a virtual collaboration session, wherein the engagement metrics are indicative of the participant's level of engagement in the virtual collaboration session;

calculate a score based upon a weighted sum of the engagement metrics using a weight value assigned to each engagement metric;

determine, using a hardware sensor coupled to the IHS, a proximity of the participant with respect to another participant of the virtual collaboration session;

change a weight value assigned to an engagement metric depending upon the proximity;

change another weight value assigned to another engagement metric depending upon whether the participant has typed a keyword that has been spoken during the virtual collaboration session;

re-calculate the score using the changed weight value and the changed another weight value; and in response to the re-calculated score meeting a threshold value that indicates the participant has disengaged from the virtual collaboration session, increase or reduce a duration of the virtual collaboration session.

14. The hardware memory device of claim 13, wherein the program instructions, upon execution, further cause the IHS to select one or more of the engagement metrics to calculate the score depending upon a context where the participant is found during the virtual collaboration session, and wherein the context includes an in-person meeting or a remote meeting.

15. The hardware memory device of claim 13, wherein the receiving and calculating are performed as a background process, and wherein the providing occurs in response to a determination that an engagement metric has reached a corresponding threshold value.

16. The hardware memory device of claim 13, wherein the program instructions, upon execution, further cause the IHS to allow the participant to change a weight value assigned to an engagement metric depending upon the participant's personal preference for prioritizing a first activity over a second activity.

17. The hardware memory device of claim 13, wherein the program instructions, upon execution, further cause the IHS to: (a) increase the score based, at least in part, upon an improvement of a selected engagement activity for a predetermined period of time; or (b) reduce the score based, at least in part, upon a lack of a selected engagement activity for a predetermined period of time.

* * * * *